Sept. 30, 1924.                                                 1,510,205
J. T. BEATY
COTTON TRAMPER
Filed April 9, 1924        6 Sheets-Sheet 1

Inventor
J. T. Beaty,
By William L. Symons
his Attorney

Sept. 30, 1924.

J. T. BEATY

COTTON TRAMPER

Filed April 9, 1924

Inventor

J. T. Beaty,

By William L. Symons

Attorney

Sept. 30, 1924.

J. T. BEATY

COTTON TRAMPER

Filed April 9, 1924    6 Sheets-Sheet 6

Inventor

J. T. Beaty,

By William L. Symons his Attorney

Patented Sept. 30, 1924.

1,510,205

UNITED STATES PATENT OFFICE.

JAMES T. BEATY, OF CHARLOTTE, NORTH CAROLINA, ASSIGNOR TO LIDDELL COMPANY, OF CHARLOTTE, NORTH CAROLINA, A CORPORATION OF NORTH CAROLINA.

COTTON TRAMPER.

Application filed April 9, 1924. Serial No. 705,344.

*To all whom it may concern:*

Be it known that I, JAMES T. BEATY, a citizen of the United States of America, residing at Charlotte, in the county of Mecklenburg and State of North Carolina, have invented certain new and useful Improvements in Cotton Trampers, of which the following is a specification.

My invention relates to a press of the kind usually referred to as an automatic cotton tramper and includes automatic operating and timing valves.

An object of my invention is the construction of an automatic tramper which is simple in construction, economical to build and efficient in operation.

A further object is the construction of a valve by which the movement of the tramper head in the press box is operated and regulated and which may be operated manually or automatically.

A further object is the construction of a timing valve by means of which the reciprocation of the tramper head in the press box may be regulated as to the number of strokes and as to the time between the strokes either while the apparatus is in operation or while it is not in operation.

Among the further objects of my invention are, the novel construction of the tramper weight, the construction of the valve to eliminate "wire drawing" or the cutting action due to restricted opening, the means used to restrict the liquid outlet opening and the means provided for cushioning the tramper weight to prevent shock to the parts of the apparatus on the downward movement of the weight.

With these and further objects in view, one embodiment of my invention is shown in the accompanying drawings in which:—

The parts of my mechanism may for convenience be designated as follows:—

A—The tramper head, cylinder head, piston, weight and their connecting parts;

B—The operating valve and parts thereof, and

C—The timing valve and parts thereof.

*General construction.*

Figures 1, 9, 25:
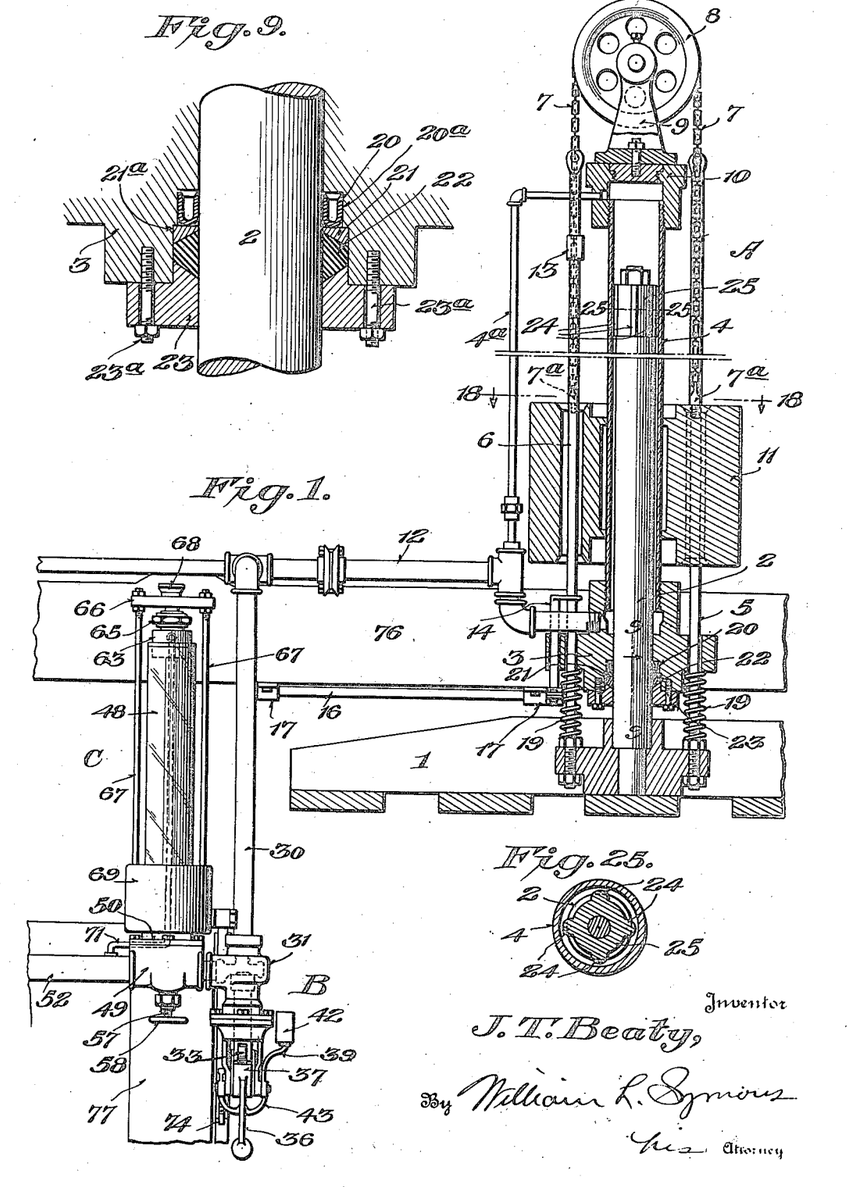
Figure 1 is a side elevation partly in section showing my improved device.
Figure 9 is a section on lines 9—9 of Figure 1.
Figure 24 is a side view of the operating sheaves with the operating chains omitted and Figure 25 is a section on lines 25—25 of Figure 1.
Figures 2, 4, 5:
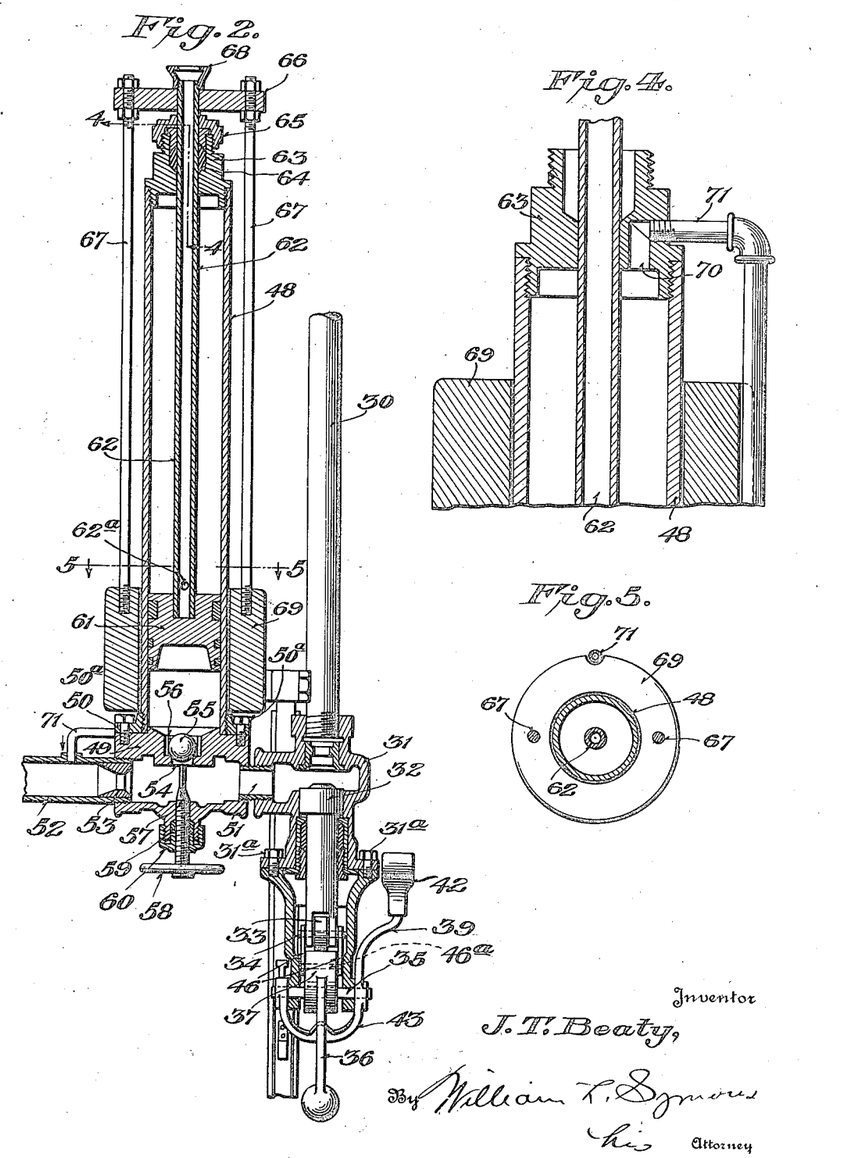
Figure 2 is a vertical section through the operating and timing valves.
Figure 4 is a section on lines 4—4 of Figure 2.
Figure 5 is a section on lines 5—5 of Figure 2.

The general construction of my device is indicated in Figures 1 and 2. Pressure operating means may be supplied by any well-known device such as a pump which I have not shown. The pressure medium may be water, oil, or any other analogous liquid. The tramper head in Figure 1 is in that position occupied before it starts its downward movement into the conventional press box, not shown. The operating valve is indicated in Figures 1 and 2 as open and the timing mechanism weight is shown in these figures in its lower position.

*Tramper construction.*

Figures 3, 6, 7, 8:
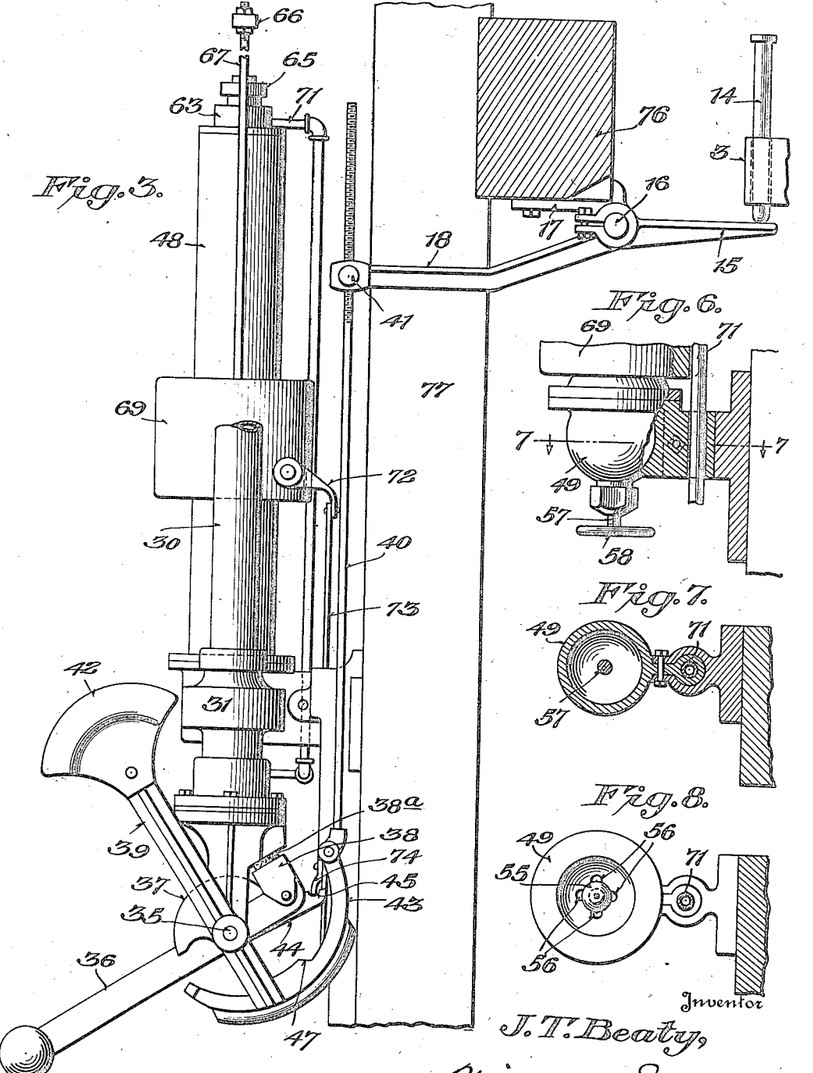
Figure 3 is an end elevation of the operating and timing valves with the operating valve in open position.
Figure 6 is a fragmentary side elevation of the timing valve partly in section.
Figure 7 is a section on lines 7—7 of Figure 6.
Figure 8 is a top plan view of the ball valve used in the timing valve, the casing and piston being omitted.

The tramper head 1 has attached thereto a piston 2 which passes through the cylinder head 3 and fits loosely in piston casing 4 secured to the cylinder head. Attached to the tramper head on opposite sides of the piston are guide rods 5 and 6 which extend upward through the cylinder head parallel with the piston casing approximately the height thereof. Attached to the upper parts of each are two chains 7 which extend over two sheaves 8 journaled in an extension 9 of the head 10 of the piston casing having the other end of each chain attached as by screw pointed extensions 7ª of said chains to a weight 11 through which the guide rods pass. The openings through this weight permit the rods to move freely through it. The cylinder head has connected therewith a pipe 12 leading from the pressure pump, not shown. Liquid forced into the cylinder head will pass to the top of the piston head due to the loose fit of the piston in the cylinder casing and cause it to descend. This descent will continue until the weights reach the highest point or until the trip block 13 attached to the guide rod 6 pushes downward the trip rod 14 one end of which encircles the guide rod 6 and the other end of which abuts the trip lever 15 (Figure 3). The trip lever (Figure 12) clamped to the shaft 16 journaled in brackets 17 through the arm 18 operates a yoke to open the operating valve. The opening of the valve is arranged to take place when the weight has reached its upward limit of travel and the tramper head its lower limit. It is evident that when the valve is opened the pump pressure will be relieved and the liquid will then flow through an outlet pipe to which the operating valve is connected back to a tank, not shown. This flow of the liquid will continue until the valve is closed.

The guide rods may have springs 19 between the tramper head and the cylinder head in order that the upward movement of the head may be stopped without shock.

The packing of the tramper piston as shown clearly in Figure 9 comprises a U-shaped washer 20 of suitable material such as leather placed around the piston in an annular groove 20ª; a ring 21 of suitable material such as metal placed in an annular groove 21ª of slightly greater diameter than the groove 20ª in order that the metal ring may hold the U-shaped washer in place and be prevented from pressing it out of shape or crushing it; a packing 22 of suitable material such as rawhide below said ring and a gland 23 to hold the packing in position, this gland being attached to the cylinder head in any suitable way as by studs 23ª. The ends of the arms of the U-shaped leather washer are beveled from the inside outward forming sharpened edges to press against both the piston and the wall of the annular groove. Any excess of oil which flows down the piston is caught by the arms of the leather washer which direct it into the opening between the arms pressing the arms outward. The metal ring may be a right-angled triangle in cross section. The soft packing may be trapezoidal in cross section. This packing is very efficient and the arrangement of the parts permits any worn out or injured part to be readily replaced.

The upper end of the tramper piston may have the construction shown in Figure 25 where ribs 24, four in number, are made on the head 25 of the piston in order that liquid may readily reach the top of the casing and that the piston may also be held straight in the casing.

A small pipe 4ª which runs from an opening through the head of the piston casing to the pipe leading to the cylinder head allows the escape of air from the top of the piston casing.

Figures 18, 19, 20, 21, 22, 23, 24:
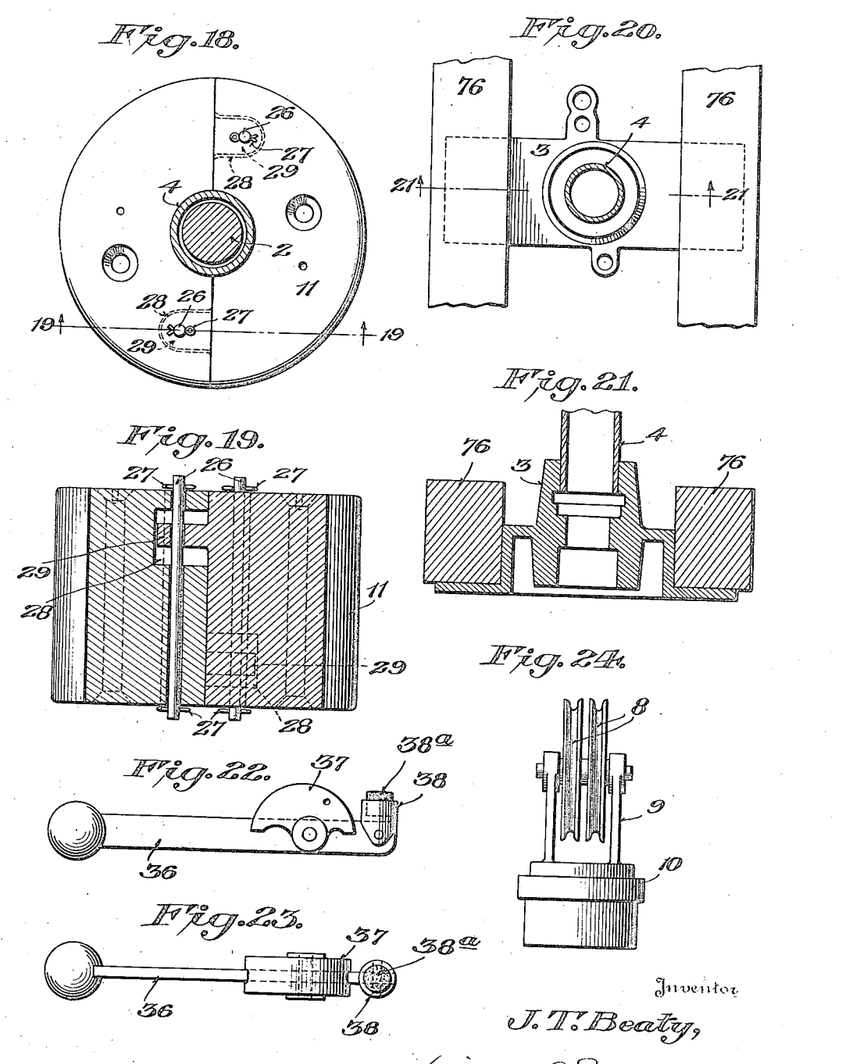
Figure 18 is a section on lines 18—18 of Figure 1.
Figure 19 is a section on lines 19—19 of Figure 18.
Figure 20 is a top plan view of the head of the cylinder casing.
Figure 21 is a section on lines 21—21 of Figure 20.
Figure 22 is a side elevation of the cam lever.
Figure 23 is a top plan thereof.

The construction of the weight 11 is best shown in Figures 18 and 19. This weight consists of two parts connected together by pins 26 having cotter pins 27 in the ends thereof. Each of the parts of my weight has a cavity 28 therein and an ear 29 of lesser thickness than the width of the cavity. The connecting pins pass through the ears in the respective parts. The two parts, therefore, may move relative to each other the distance indicated by the width of the cavity less the thickness of the ear. This construction automatically keeps both chains the same tension and also prevents binding of the weight on the cylinder casing.

*Operating valve.*

The construction of the operating valve is best shown in Figure 2. In Figures 2 and 3 it is shown in open position and in Figure 11 in closed position.

Connected to the pressure pump pipe 12 is a pipe 30 having attached to the lower end thereof a two-piece hollow valve casing 31 connected together in any suitable manner as by cap screws 31ª. In this casing, positioned to operate to close the opening from the pipe through the casing, is a valve plug 32 which has a roller 33 mounted in the end thereof by means of a pin 34 extending through the end of the plug, the ends of the pin extending a short distance beyond the surface of the plug. Mounted in the end of the casing by means of a cam pin 35 is a cam lever 36 having as a part thereof a cam 37 by means of which the plug is placed in a closed position. This cam lever has a head 38 on the end thereof cushioned as by a rubber tip 38$^a$ to lessen the shock when the movement of the lever is stopped as shown in Figure 3 when the valve is closed. Pivoted to the cam pin is a yoke 39 (see Figures 2, 15, 16, and 17) to which is attached a trip rod 40 (Figure 3), the upper end of which is screw-threaded in a rotating pin 41 inserted in the end of the arm 18. This arrangement of the trip rod makes it adjustable as to height. The yoke lever 39 has on one arm thereof a removable weight 42, the other arm 43 thereof being pivotally attached to the trip rod, as above stated. Attached to the stem of the yoke is a pawl-engaging arm 44 having a pawl-engaging recess 45 near the end thereof.

Figures 12, 13, 14, 15, 16, 17:
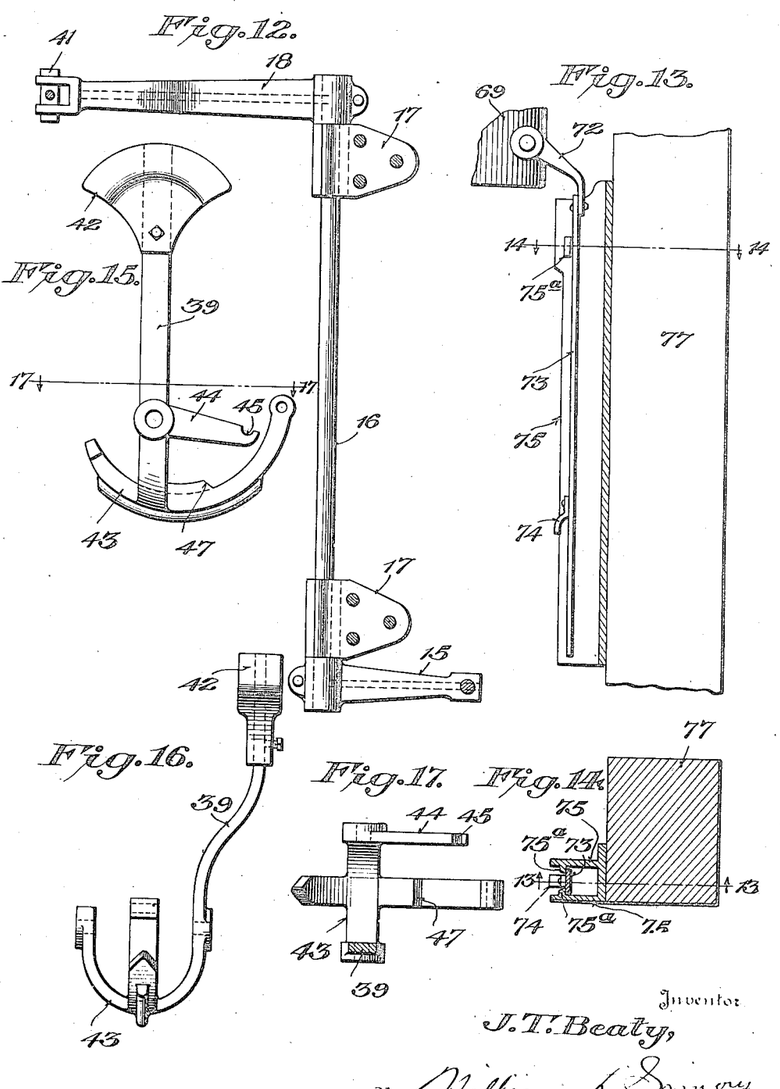
Figure 12 is a plan view of a shaft having levers attached to each end thereof.
Figure 13 is a section on line 13—13 of Figure 14 showing the valve trip.
Figure 14 is a section on lines 14—14 of Figure 13.
Figure 15 is an end elevation of the yoke lever.
Figure 16 is an elevation of this lever turned 90 degrees from the position shown in Figure 15.
Figure 17 is a section on lines 17—17 of Figure 15.

It will be evident that the valve plug may be manually operated by the cam lever arm and that it will be operated automatically by the movement of the tramper weight through the connections which have been described. The valve plug will normally drop to open position by the force of gravity and pressure of fluid when the cam 37 is removed from contact with the end thereof; but in order that its action may be positive and insure instant full opening, two thin steel straps 46 are connected with the ends of the roller pin and the cam in order to pull the valve from its seat to full open when the cam lever is in the position shown in Figure 3. One end of each strap is placed over the end of the roller pin and the other is fastened to the cam by any suitable means as a pin 46$^a$. It will be noted that the substantially semi-circular part of the yoke lever as shown in Figure 15 has a shoulder 47 (see Figures 15 and 17) which comes in contact with the curved end portion of the cam lever after the yoke weight has reached a vertical position (see Figures 3, 10, and 11). This contact causes the weight to drop its full distance snapping the valve into open position as shown in Figure 2 and preventing "wire cutting" by the instantaneous full opening of the valve.

*Timing valve.*

The timing valve mechanism closes the operating valve, regulates the number of strokes per bale that the tramper head makes and the length of time it pauses between strokes. This valve consists of a casing 48 mounted on a hollow connecting head 49 having a reinforcing ring 50 placed on said head at the base of the casing and attached to the head in any suitable manner as by screws 50$^a$. The head is connected to the operating valve casing in any suitable way as by a pipe joint 51 and has connected to it an outlet pipe 52 leading to a tank or other receptacle, not shown. The opening between the head and the outlet pipe is restricted in any desired manner as by the use of a Venturi tube 53. There is an opening 54 from the hollow head in which is a ball valve 55 which normally closes the opening from the hollow casing with the exception of the small side openings 56, four being shown (Figure 8). These openings allow the liquid in the hollow head to flow out around the ball as soon as the ball has been raised off its seat by means of a screw-threaded stem 57 which may be operated in any suitable way as by a hand wheel 58. This stem has suitable packing 59 and a covering nut 60. Within the casing is a piston 61 having a hollow piston rod 62 attached thereto. This rod extends upward and through the head 63 which is screw-threaded into the casing having suitable packing 64 and a covering nut 65. Attached to the top of the piston is a saddle 66 having supporting rods 67 attached thereto. The top of the piston may be covered by a screw cap 68. The lower ends of the supporting rods are screw threaded to a weight 69 which slides freely on the outside of the valve casing. An opening 70 is provided from the top of the casing from which a pipe 71 leads to the outlet pipe, the entrance to said outlet pipe being made beyond the restricted part of said outlet. The obvious purpose of this pipe is to carry off any liquid which may get above the piston 61 and to permit air to escape as the piston moves up. An opening 62$^a$ into the piston rod acts as an auxiliary outlet for oil or air. The pipe 71 acts as a guide for the timing valve weight as shown clearly in Figures 4 and 5.

Figures 10, 11:
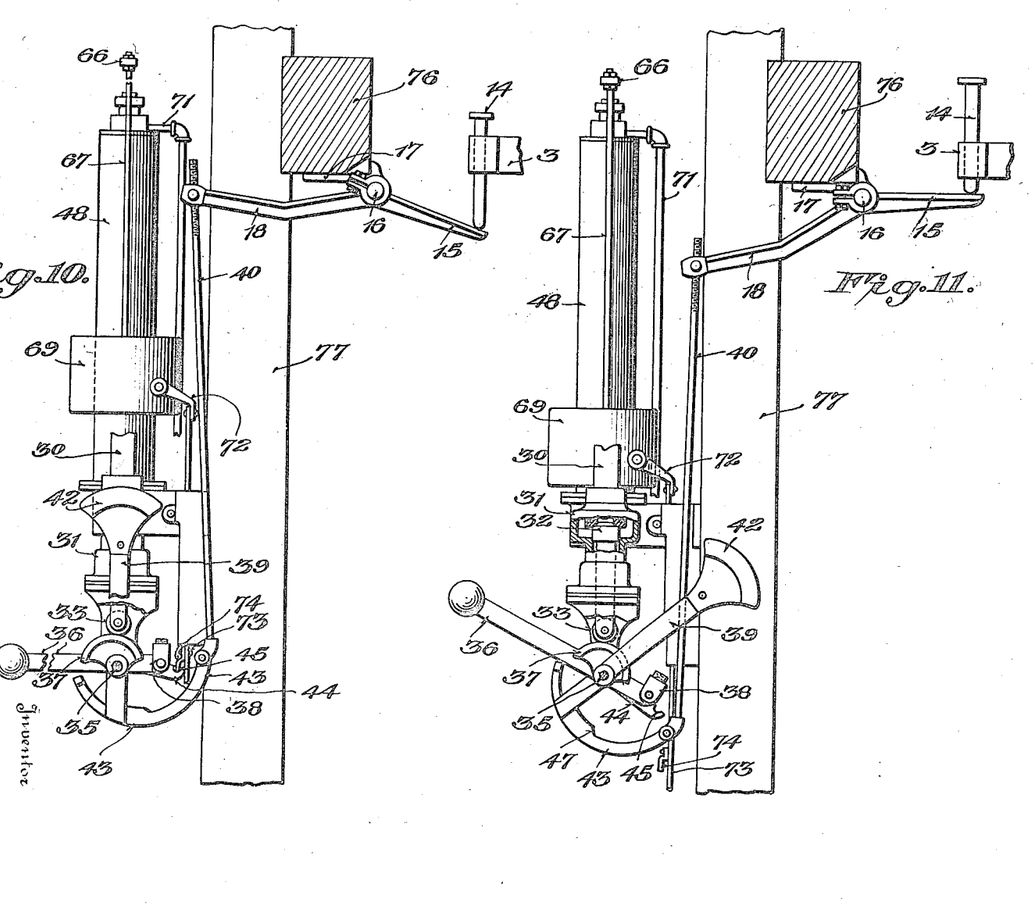
Figure 10 is an end elevation of the timing and operating valves with the operating valve in neutral position.
Figure 11 is the end elevation of the timing and operating valves with the operating valve in closed position.

Attached to the timing valve weight 69 (see Figures 3, 10, 11, and 13), as by a curved part 72, is a slide rod 73 having a tripping pawl 74 which, as the weight descends, engages the arm 44 at the recess 45 and pushes the yoke lever downward, raising the weight attached thereto until it passes just beyond the position shown in Figure 10, when the weight falls instantly by its own force, closing the operating valve. The closing of the valve results, as will be evident, from the cam 37 acting on the roller 33 which is mounted in the end of the valve plug 32. This slide rod reciprocates in a substantially U-shaped guide 75 having guide points 75$^a$ at the top thereof.

The parts of the tramper may be supported in any of the usual ways of supporting such machinery. The cylinder head may be supported by cross beams 76. Guide parts of the timing valve may be attached to a post 77 connected to the cross beams 76 to which beams are also attached the brackets 17 supporting the rod 16.

*Mode of operation.*

The tramper is put in operation by manually closing the valve plug by throwing the yoke lever forward. The liquid from the pressure pump will then enter the tramper piston casing, forcing the piston down by pressure or by displacing the piston. This downward movement will continue until the trip lug strikes the trip rod and, by downward movement thereof through the connections described, causes the operating valve plug to be opened. As has been pointed out, the valve is opened by the block 13 pushing down the trip rod 14 which presses down the lever 15. As the lever 15 is pushed down, the arm 18 is raised, throwing the valve in open position through the rod 40. As soon as this plug is withdrawn, the liquid passes freely through the operating valve and back to a tank. Passage of the liquid through the operating and timing valves is aided by the size of the pipe 12 from the cylinder head to the point of connection with the pipe 30 and the smaller size of that pipe from the point of connection to the pump. The tramper weight has reached its upward limit of travel when the operating valve is opened. As the pressure has been relieved, this weight will descend by force of gravity, raising the tramper head out of the press box. The rush of liquid through the operating valve and the opening in the head of the timing valve causes pressure in this space, due to the restricted area of the outlet pipe. This pressure will cause the valve ball plug to become unseated and the liquid will force upward the timing valve piston to its highest point. As soon as the pressure in the timing valve casing has been relieved, the weight begins to descend, the rate at which it descends depending on the leakage around the ball. This leakage may be controlled, as has been explained, by means of the hand-operated stem abutting the surface of the ball. The slide attached to the timing valve weight has a pawl which engages the arm of the operating yoke, carrying the yoke weight to just beyond its vertical position. As soon as this weight has passed beyond the vertical position, it will drop the remaining distance of its travel, instantly closing the operating valve. The liquid from the pump will then again pass into the tramper casing and repeat the operation of forcing the tramper head to the lowest point of its travel.

It will be evident that the time the operating valve remains open will be governed by the length of time it takes the timing valve weight to descend to the point where its descent results in the operation of the lever controlling the operating valve. This timing valve may be placed in the condition desired before the device is set in operation, or it may be changed during the operation of the device.

The construction of the operating valve is such that it both opens and closes suddenly, or in other words, it may be said it "snaps" open and "snaps" closed. This action of the valve is due to the described construction which does not cause the valve plug to move until the yoke lever weight passes just beyond the vertical position. When the weight passes the vertical in either direction the valve either opens or closes instantly.

My device is so constructed that it may be used as a semi-automatic tramper without the timing device. When so used the operating valve is closed manually to begin the downward stroke of the tramper, but automatically opens on completion of the downward stroke, and the tramper piston makes the return stroke where it remains until the operating valve is again closed manually.

Having described my invention, what I claim as new and desire to protect by Letters Patent is:

1. In a device of the kind described, the combination of a tramper head, means to operate said head including a valve, and means to time the operation of said valve, said timing means adapted to be adjusted to vary the speed of the operation of the device.

2. In a device of the kind described, the combination of a tramper head, means to operate said head including a valve and means to time the operation of said valve, said timing means adapted to be adjusted to vary its speed while the device is in operation and also when not in operation.

3. In a device of the kind described the combination of a tramper head, means to operate said head including an exhaust operated valve and means to regulate the flow of the exhaust fluid to time the operation of said valve.

4. In a device of the kind described, the combination of a tramper head, means to operate said head including a valve, means connected with said head to open said valve and means to close said valve manually.

5. In a device of the kind described, the combination of a tramper head, means to operate said head including a valve, means connected with said head to open said valve and means to close said valve manually, said opening and closing means being capable of operation at any time during the movement of the tramper head up or down.

6. In a device of the kind described, the combination of a tramper head, means to operate said head including a valve, automatic means connected with said head to open said valve, automatic means to close said valve and means to regulate the time when said automatic opening and closing means will act.

7. In a cotton tramper the combination of a cylinder head, a tramper head, a piston for said head adapted to be reciprocated in connection with said cylinder head, means to supply fluid pressure to said cylinder head to cause said piston to reciprocate, a valve connected with the means to supply fluid pressure, means to operate said valve and timing mechanism for said valve operatively connected thereto, said timing mechanism being operated when said valve is opened by the supply of fluid pressure used to reciprocate the piston when said valve is closed.

8. In a cotton tramper, the combination of a cylinder head, a tramper head, a piston for said head adapted to reciprocate in connection with said cylinder head, means to supply fluid pressure to said cylinder head to cause said piston to reciprocate, a valve connected to the means to supply fluid pressure, means to operate said valve comprising a weight, a connection between said tramper head and said weight, a valve lever, means on said connection to operate said valve lever, timing mechanism for said valve operatively connected thereto, said timing mechanism being operated when said valve is open by the supply of fluid pressure used to operate the piston when said valve is closed.

9. In a cotton tramper, the combination of a cylinder head, a tramper head, a piston for said head adapted to be reciprocated in connection with said cylinder head, means to supply fluid pressure to said cylinder head to cause said piston to reciprocate, a valve connected to the means to supply fluid pressure, means to operate said valve comprising a weight, a connection between said tramper head and said weight, a valve lever, means on said connection to operate said valve lever, timing mechanism for said valve operatively connected thereto, said timing mechanism being operated when said valve is open by the supply of fluid pressure used to operate the piston when said valve is closed, said timing mechanism comprising a hollow head, said hollow head having a restricted outlet, said hollow head having a second outlet opened and closed by a valve, a weight operated by the pressure of the fluid supply as it passes through the hollow head due to the restricted outlet therefrom, said weight having operating valve closing means thereon.

10. In an apparatus of the kind described, a tramper operating weight, said weight comprising two parts, each of said parts having an opening therein and each of said parts having an extension therein adapted to extend into said opening, said opening being of greater diameter than the extension extending therein and means to attach said parts together.

In testimony whereof I affix my signature.

JAMES T. BEATY.